(12) United States Patent
Katayama et al.

(10) Patent No.: US 6,482,892 B1
(45) Date of Patent: Nov. 19, 2002

(54) OLEFINIC THERMOPLASTIC ELASTOMER COMPOSITION

(75) Inventors: Seizo Katayama, Tokyo (JP); Kazuo Kimura, Tokyo (JP); Kazuhiro Ohashi, Tokyo (JP); Minoru Horie, Tokyo (JP)

(73) Assignee: JSR Elastomix Co., Ltd., Tokyo (JP)

( * ) Notice: Subject to any disclaimer, the term of this patent is extended or adjusted under 35 U.S.C. 154(b) by 9 days.

(21) Appl. No.: 09/604,099

(22) Filed: Jun. 27, 2000

(30) Foreign Application Priority Data

Jun. 28, 1999 (JP) .......................... 11-181772
Sep. 13, 1999 (JP) .......................... 11-259150
Dec. 9, 1999 (JP) .......................... 11-349930

(51) Int. Cl.$^7$ .................. C08L 23/02; C08L 23/08; C08L 21/00; C08L 23/16
(52) U.S. Cl. .............. 525/191; 525/210; 525/211; 525/227; 525/231; 525/232; 525/235; 525/236; 525/237; 525/238; 525/239; 525/240; 525/241
(58) Field of Search .................. 525/191, 210, 525/211, 227, 231, 232, 235, 236, 237, 238, 239, 240, 241

(56) References Cited

FOREIGN PATENT DOCUMENTS

| EP | 0 468 947 | 1/1992 |
|---|---|---|
| JP | 2-140236 | 5/1990 |
| JP | 2-235949 | 9/1990 |
| JP | 09-316286 | 12/1997 |
| WO | WO 98/58993 | 12/1998 |
| WO | WO 99/20681 | 4/1999 |

*Primary Examiner*—Nathan M. Nutter
(74) *Attorney, Agent, or Firm*—Oblon, Spivak, McClelland, Maier & Neustadt, P.C.

(57) ABSTRACT

An olefinic thermoplastic elastomer composition which does not exhibit problems due to a softening agent such as an oil is superior in molding processability. The thermoplastic elastomer composition is produced by a heat crosslinking process of a resin-rubber composition that contains an olefinic and/or diene rubber, an olefinic resin, and a vinyl copolymer. The vinyl copolymer is obtained by copolymerizing 20 wt % or more of a vinyl monomer represented by $CH_2=CHOCOR^1$ or $CH_2=CHOR^2$ wherein $R^1$ and $R^2$ are alkyl groups having 1–6 carbon atoms. The thermoplastic elastomer composition can include a vinyl copolymer that has not undergone a heat crosslinking process.

22 Claims, 1 Drawing Sheet

OLEFINIC THERMOPLASTIC ELASTOMER COMPOSITION

BACKGROUND OF THE INVENTION

1. Field of the Invention

This invention relates to an olefinic thermoplastic elastomer composition (hereinafter, also referred to simply as "elastomer composition"). More particularly, this invention relates to an elastomer composition: that has sufficient mechanical properties, such as flexibility and elastic recoverability, and durability; that does not contaminate the surface of a molded article by the use of a softening agent, thereby avoiding environmental pollution; that has sufficient flame resistance using a small amount of flame retardant; that is superior in molding processability; and that is useful in various industrial fields, such as automotive interior/exterior parts, packing and housing of weak-electric products, watertight seats, gasket seals, and electric wire coating.

2. Discussion of the Background

Conventionally, olefinic thermoplastic elastomer compositions have been prepared by dynamically applying heat treatment, in the presence of a crosslinking agent, to rubber, olefinic resin, and softening agents such as paraffinic mineral oil, and the like. The step of processing the elastomer composition does not require vulcanization, and can be carried out according to the usual methods of processing thermoplastic resin, such as injection molding, extrusion molding, such as contour extrusion, calendering, and blow molding.

However, this elastomer composition is inferior in durability and does not have sufficient mechanical properties, such as flexibility and elastic recoverability, because the composition contains a softening agent. In addition, the softening agent causes bleedout to the surface of a molded article over time, and this might cause environmental pollution because of the vaporization thereof. In order to address these problems, studies have been made on the improvement in crosslinking density, the kind of rubber to be combined and the compounding ratios thereof, the kind of the softening agent and the content thereof, and the like. As a result, the durability, and the like, have been improved, but a new problem has occurred because the molding processability is lowered.

On the other hand, some elastomer compositions which have flame resistance have been conventionally prepared using various inorganic and organic flame retardants. However, in order to obtain sufficient flame resistance, normally a large amount of flame retardant of 200–300 parts by weight must be mixed with the elastomer. Disadvantageously, this lowers mechanical properties (such as flexibility and elastic recoverability) and durability. Another problem is that this kind of elastomer must be mixed with a large amount of softening agent (more than 20 parts by weight, for example) to maintain rubbery properties and loses its flame resistance due to the softening agent.

In order to solve these problems, in a technique of dynamically applying heat treatment in the presence of crosslinking agents, to rubber, olefinic resin, and softening agents such as paraffinic mineral oil, and the like, studies have been performed on the improvements in crosslinking density, the kind of rubber to be combined and the compounding ratio thereof, the kinds of flame retardants and softening agents and the content thereof, and the like. As a result, the durability, and the like, has been improved, but a new problem has occurred because the molding processability is lowered, and sufficient flame resistance cannot be easily obtained.

The molding processability can be improved by specifying the kind of olefinic resin, and the physical properties thereof, and the like. However, the use of such olefinic resin shows a tendency to lower the elastic modulus and raise hysteresis loss. Thus, it is not easy for the conventional olefinic thermoplastic elastomer composition to have sufficient flame resistance, mechanical properties, and durability, while environmental pollution is prevented, and also have excellent molding processability.

SUMMARY OF THE INVENTION

The present invention was made to solve the aforementioned conventional problems. It is an object of the present invention to provide an olefinic thermoplastic elastomer composition that is superior in flame resistance, mechanical characteristics, such as flexibility and elastic recoverability, and durability; that does not cause stains on the surface of a molded article nor environmental pollution which is caused by, for example, halogen containing flame retardants or paraffinic mineral oil as softening agents; and that also has excellent molding processability.

An olefinic thermoplastic elastomer composition according to a first aspect of the present invention is characterized in that it is produced in the presence of a crosslinking agent by applying heat treatment to a resin-rubber composition that contains an olefinic rubber and/or diene rubber, an olefinic resin, and a vinyl copolymer, wherein a vinyl monomer represented by the chemical formulae (1) or (2) is copolymerized in an amount of 20 percent by weight or more.

$$CH_2=CHOCOR^1 \quad (1)$$

$$CH_2=CHOR^2 \quad (2)$$

wherein $R^1$ and $R^2$ are each an alkyl group having a number of carbon atoms of 1–6.

An olefinic thermoplastic elastomer composition according to a second aspect of the present invention is characterized in that it comprises a heat crosslinked resin-rubber composition, produced in the presence of a crosslinking agent by applying heat treatment to a resin-rubber composition that contains an olefinic rubber and/or diene rubber, and an olefinic resin; and a vinyl copolymer, wherein a vinyl monomer represented by above mentioned chemical formulae (1) or (2) is copolymerized in an amount of 20 percent by weight or more, and wherein at least a part has not undergone heat treatment in the presence of the crosslinking agent.

An olefinic thermoplastic elastomer composition according to a third aspect of the present invention is characterized in that it is produced in the presence of a crosslinking agent by applying heat treatment to a resin composition that contains an olefinic resin and a vinyl copolymer, wherein a vinyl monomer represented by above mentioned chemical formulae (1) or (2) is copolymerized in an amount of 20 percent by weight or more.

An olefinic thermoplastic elastomer composition according to a fourth aspect of the present invention is characterized in that it comprises a heat crosslinked resin composition, produced in the presence of a crosslinking agent by applying heat treatment to a resin composition that contains an olefinic resin; and a vinyl copolymer, wherein a vinyl monomer represented by above mentioned chemical formulae (1) or (2) is copolymerized in an amount of 20 percent by weight or more, and in which at least a part has not undergone heat treatment in the presence of the crosslinking agent.

According to the present invention, an olefinic thermoplastic elastomer composition can be obtained which has sufficient mechanical characteristics, such as flexibility and elastic recoverability, and durability; which does not cause stains on the surface of a molded article nor environmental pollution which is caused by, for example, softening agents such as oils; and which also has excellent molding processability. The elastomer composition of the present invention may have more superior characteristics if the weight ratio between the olefinic rubber and/or diene rubber, olefinic resin, and vinyl copolymer is as stated in claim 2, 10, 18 or 26; if the weight ratio of crosslinking agents is as stated in claim 3, 11, 19 or 27; and if the weight ratio of flame retardants is as stated in claim 5, 13, 21 or 29.

Further, the elastomer composition of the present invention does not cause environmental pollution due to a smaller content of oils serving as a softening agent as stated in claim 7, 15, 23 or 31.

DETAILED DESCRIPTION OF THE INVENTION

Figure 1:
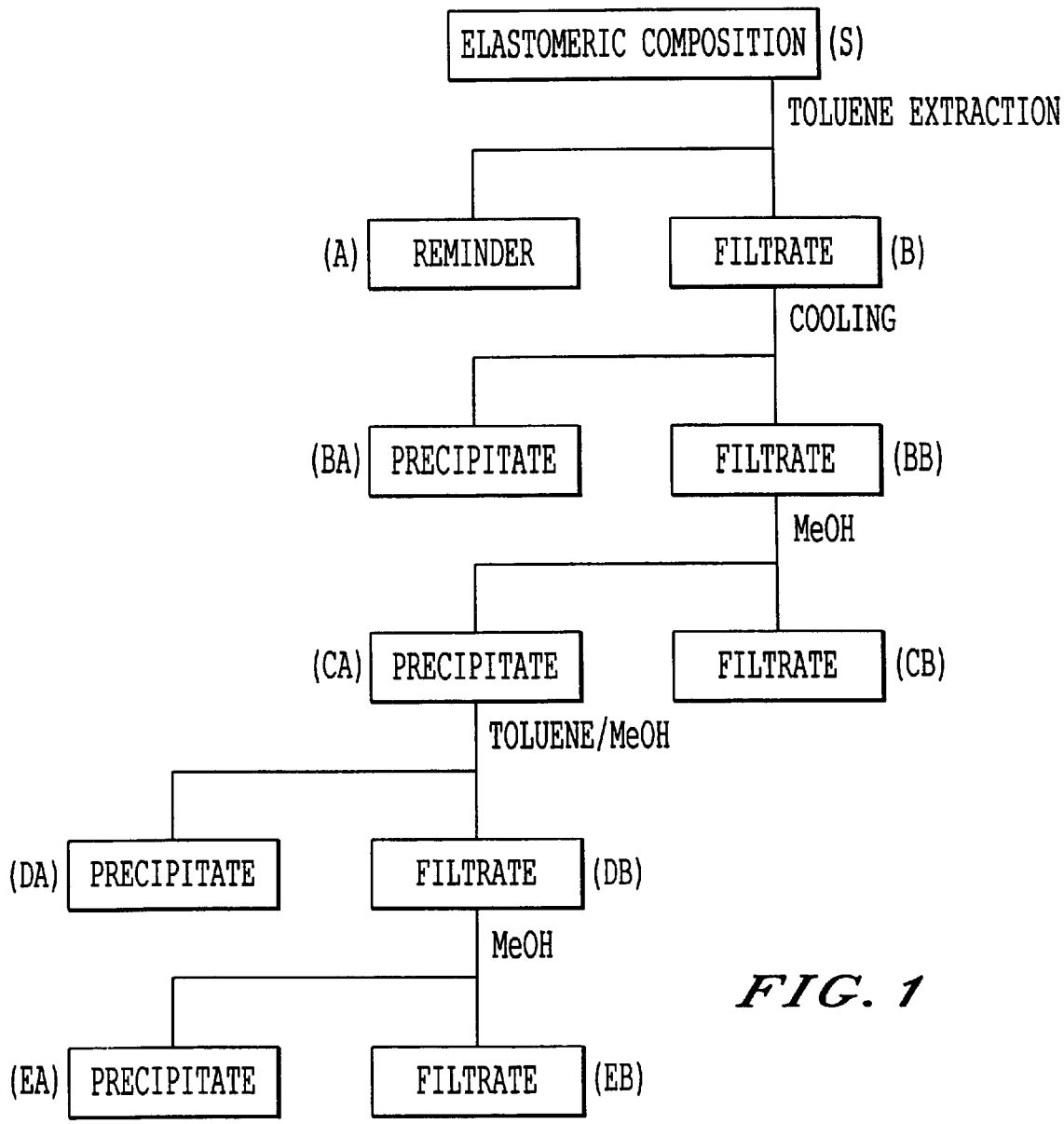
FIG. 1 is an explanatory drawing showing an operating procedure in calculating a crosslinking gel percentage and a non-crosslinking component percentage.

In the elastomer compositions according to the first and second aspects of the present invention, ethylene-olefinic copolymer rubber, and diene copolymer rubber from one or more kinds of monomers, such as styrene and acrylonitrile, and diene monomer, such as butadiene, can be used as the aforementioned "olefinic rubber and/or diene rubber" (hereinafter, referred to as "copolymer rubber").

The "ethylene-olefinic copolymer rubber" may be a random copolymer of ethylene and α-olefin, wherein the number of carbon atoms is 3 or more, preferably 3 to 8, and a nonconjugated diene, if necessary, and the like. Monomers that include halogen atoms such as chlorine can also be copolymerized. As α-olefin having a number of carbon atoms of 3 or more to be copolymerized with ethylene, there can be mentioned propylene, 1-butene, 1-hexene, 1-pentene, 1-octene, 1-decene, and the like. Only one kind of α-olefin can be used, or, instead, two or more kinds of α-olefins can be used together. As nonconjugated diene which is copolymerized when necessary, there can be mentioned dicyclopentadiene, 1,4-hexadiene, cyclooctadiene, methylenenorbornane, ethylidenenorbornane, 7-methyl-1,6-octadiene, and the like. The ethylenic random copolymer may have a branched structure obtained by a usual method. 1,9-decadiene and norbornadiene, and the like, can be mentioned as desirable dienes to give the branched structure. Only one of these nonconjugated dienes can be used, or, instead, two or more kinds of dienes can be used together. Isoprene-isobutylene copolymer rubber, and the like, can also be used as the olefinic rubber.

As "diene rubber", there can be mentioned styrene-butadiene rubber (SBR), styrene-butadiene block copolymer rubber, styrene-isoprene rubber, styrene-butadiene isoprene rubber, butadiene rubber, isoprene rubber, crude rubber, their block copolymer rubbers, and the like. In addition, acrylonitrile-butadiene rubber, acrylonitrile-butadiene-isoprene rubber, and acrylonitrile-isoprene rubber can be used. Diene rubber in which some double bonds or all the double bonds undergo hydrogenation can also be used. Modified ethylenic copolymer rubber in which unsaturated monomers, such as conjugated dienes, are graft-polymerized can also be used as the copolymer rubber. Monomers that include halogen atoms, such as chlorine, can be further copolymerized with these various copolymer rubbers.

If necessary, copolymer rubbers in which extender oil is added beforehand can be used as these various copolymer rubbers. These copolymer rubbers can be used in the form of any one of bales, crumbs, and pellets. Only one of these kinds of copolymer rubbers can be used, or, instead, two or more of them can be used together.

In case the nonconjugated diene is copolymerized, a copolymerization ratio is preferably in a range so that a copolymer rubber to be generated has an iodine value of 60 or less. The iodine value is preferably 5–50, and more preferably 10–50. The use of such a copolymer rubber makes it possible to produce an elastomer composition having a harmonious balance between fluidity and rubbery properties. Ethylene-propylene-diene rubber (EPDM) is more preferable than ethylene-propylene rubber (EPR) from the viewpoint of flexibility and elastic recoverability of the elastomer composition (The elastic recoverability is evaluated by compression set. If the compression set is large, it is inferior in elastic recoverability, and, if small, it is superior.). More preferably, the rubber has a large molecular weight and a lot of unsaturated bonds. However, the relationship to the fluidity of the elastomer composition must be considered to select the best rubber.

Olefinic rubbers, such as EPDM, and diene rubbers, such as SBR, can be easily cross-linked by mixing a crosslinking agent, such as organic peroxides, and by conducting heat treatment. The degree of cross-linking of these copolymer rubbers is 10% or more, and more preferably 15% and more, and most preferably 20% or more. The degree of cross-linking can be 35% or more, and particularly 50% and more, and further 60% or more. The degree of cross-linking can be substantially 100% as long as the molding processability of the elastomer composition is not impaired. If the degree is less than 10%, the tensile strength of the elastomer composition becomes small, and the elastic recoverability also decreases. The degree of cross-linking of this copolymer rubber is expressed by the degree of cross-linking obtained by mixing the crosslinking agent with the copolymer rubber, and heat treatment is conducted under the same conditions. The degree of cross-linking is a value obtained by dividing the post-soak weight of the copolymer rubber, which is soaked in boiling toluene for two hours after heat treatment, by the pre-soak weight thereof, and then multiplying by 100.

The aforementioned "olefinic resin" is not limited to a specific one in the present invention. For example, low density polyethylene or high density polyethylene which is a homopolymer of ethylene can be used as the "olefinic resin". A copolymer of ethylene and a small amount of other α-olefin such as 1-butene, 1-pentene, 1-hexene, or 1-octene may be used. Isotactic polypropylene, and a copolymer made of propylene, ethylene, and a small amount of other α-olefin such as 1-butene can also be used. Chlorinated polyethylene, chlorinated polypropylene, or the like, that includes halogen atoms such as chlorine can be used as the olefinic resin. These perform the function of improving flame resistance. Only one of these kinds of olefinic resins can be used, or two or more kinds of them can be used together.

The aforementioned "vinyl copolymer" of the present invention is a copolymer obtained from monomers that include one kind of or two or more kinds of vinyl monomers selected from vinylester shown by the chemical formula (1) and vinylether shown by the chemical formula (2). When two or more kinds of vinyl monomers are used together, selection can be made from any one of the formulae (1) and (2) or from both formulae (1) and (2), respectively.

In the formulae (1) and (2), $R^1$ and $R^2$ are each preferably a methyl or ethyl group, and, most preferably, a methyl group. When the number of carbon atoms of $R^1$ or $R^2$ exceeds six, polymerization decreases, and the flexibility, elastic recoverability, and the like, of the elastomer composition decrease because a vinyl copolymer obtained by copolymerizing the monomers is hardened.

The "vinyl copolymer" is not limited to a specific vinyl copolymer as long as it is a copolymer of the aforementioned vinyl monomers and other monomers. An ethylene-vinyl acetate copolymer is mentioned as a typical example of such a copolymer. Monomers that include halogen atoms such as chlorine can be copolymerized to give this vinyl copolymer.

The copolymerization ratio of the vinyl monomers in the vinyl copolymer must be 20% by weight or more (hereinafter, "%" signifies % by weight excluding the degree of cross-linking), and preferably 25% or more. Vinyl monomers of 30% or more can also be used. The copolymer that includes the vinyl monomers having a copolymerization ratio thus high, can be cross-linked to proper extent if necessary, and can be used to easily prepare an olefinic thermoplastic elastomer composition that has the required properties. The use of a vinyl copolymer having a copolymerization ratio of vinyl monomers of less than 20% causes the resulting elastomer composition to become hardened and the elastic recoverability and molding processability thereof is lowered. A vinyl copolymer which has narrow molecular weight distribution and high strength can also be used.

The vinyl copolymer that includes the vinyl monomers with a high copolymerization ratio can be easily cross-linked by mixing a crosslinking agent, such as organic peroxide, and conducting heat treatment.

The degree of cross-linking of the vinyl copolymer is not limited to a specific one. For example, the degree of cross-linking is preferably 10% or more, and more preferably 15% or more, and most preferably 20% or more. The degree can be 35% or more, especially 50% or more, and further 60% or more. The degree can be substantially 100% as long as the molding processability of the elastomer composition is not impaired. The mechanical characteristics, such as elongation or tensile strength of the elastomer composition will be lowered if the cross-linking degree is less than 10%.

On the other hand, in order to produce an elastomer composition having excellent molding processability (shown by a melt flow rate, for example), the degree of cross-linking of the vinyl copolymer is preferably less than 20%, more preferably less than 15%, and even more preferably less than 10%. It can be substantially 0%.

The degree of cross-linking of the vinyl copolymer is expressed by the degree of cross-linking obtained by mixing crosslinking agent with the vinyl copolymer, and then heat treatment is conducted under the same conditions. The cross-linking degree thereof can be calculated in the same way as for the copolymer rubber.

In the first and second aspects of the invention, the copolymer rubber is preferably present in an amount of 30–70 parts by weight (hereinafter, "part(s) by weight" is designated simply as "part(s)"), the olefinic resin is preferably present in an amount of 10–50 parts, and the vinyl copolymer is preferably present in an amount of 20–60 parts wherein the total amount of the copolymer rubber, olefinic resin, and vinyl copolymer is 100 parts. If the copolymer rubber is used in excess, the tensile strength will become small, and the molding processability will occasionally decrease. On the other hand, if the olefinic resin is used in excess, the elongation, elastic recoverability, and the like, will exhibit a tendency to decrease.

In the third and fourth aspects of the invention, the olefinic resin is preferably present in an amount of 10–30 parts, and the vinyl copolymer is preferably present in an amount of 70–90 parts wherein the total amount of the olefinic resin and vinyl copolymer is 100 parts as stated in claim 18 or 26. Most preferably, the olefinic resin is present in an amount of 15–25 parts, and the vinyl copolymer is present in an amount of 75–85 parts. If the olefinic resin is less than 10 parts, in other words, the vinyl copolymer exceeds 90 parts, a case will occur in which the hardness, tensile strength, and the like, of the elastomer composition decrease. On the other hand, if the olefinic resin exceeds 30 parts, in other words, if the vinyl copolymer is less than 70 parts, the elastomer composition will be hardened, the elongation will decrease greatly, the compression set will increase, and the elastic recoverability will also exhibit a tendency to decrease.

The first and third aspects of the present invention relate to a method wherein, in the presence of a crosslinking agent, heat treatment is applied (hereinafter, referred to as "thermal crosslinking processing") to a resin-rubber composition or a resin composition. The respective components of the elastomer composition can be heated and a compounding ingredient can be added when necessary at a predetermined temperature. A heating temperature and time for maintaining this temperature can be properly determined according to: the properties and quantitative ratio of the respective components, the kind and quantitative ratio of the compounding ingredient, the one-minute half-life temperature of a crosslinking agent, and the like. Preferably, heating is carried out within the range of 160–200° C. in which the meltability of olefinic resin and the crosslinking reaction are kept in a good balance.

In the second and fourth aspects of the present invention, at least a part of the vinyl copolymer (in other words, part or all of the vinyl copolymer) contained in the elastomer composition has not undergone thermal crosslinking processing. On the other hand, the vinyl copolymer other than the "at least a part" has undergone the heat crosslinking processing together with or independently of the resin-rubber composition or the resin composition. Composing them in this way makes it possible to produce an elastomer composition high in fluidity and superior in molding processability because the vinyl copolymer that has not undergone the thermal crosslinking processing acts effectively as a softening agent. The fluidity can be adjusted by the ratio of the vinyl copolymer that has not undergone the thermal crosslinking processing (in other words, substantially not cross-linked) of the vinyl copolymer contained in the elastomer composition (hereinafter, the ratio is referred to "non-crosslinking ratio" of the vinyl copolymer).

An elastomer composition as above can be obtained by, for example, a step of causing components of an elastomer composition except a part of or all of a vinyl copolymer to undergo thermal crosslinking processing. Then a specific antioxidant is added and mixed with the components subjected to the processing so as to deactivate a crosslinking agent. A step of applying heat treatment to the vinyl copolymer which does not undergo the thermal crosslinking processing in the absence of a crosslinking agent is performed.

All steps are performed independently of each other, and components resulting from the steps are mixed with each other (this is called "separate processing method"). The elastomer composition can be obtained also by another method in which the components of an elastomer composition except a part of or all of a vinyl copolymer undergo thermal crosslinking processing, then adding and mixing of a specific antioxidant with the components subjected to the thermal crosslinking processing so as to deactivate a crosslinking agent. Thereafter an uncrosslinked vinyl copolymer is added to undergo heat treatment (this is called "post-addition method"). When heat treatment is conducted in the presence of a deactivated crosslinking agent, it is also said that heat treatment is conducted "in the absence of a crosslinking agent". The separate processing method and the post-addition method can be performed such that a part of a copolymer rubber and/or an olefinic resin does not undergo thermal crosslinking treatment. The excluded part undergoes heat treatment in the absence of a crosslinking agent together with a part of or all of a vinyl copolymer.

The aforementioned thermal crosslinking processing can be performed by dynamic processing, such as kneading components in a molten state while giving shear deformation. Kneading conditions can be properly set according to the properties and quantitative ratio of respective components, the kind and quantitative ratio of a compounding ingredient, the one-minute half-life temperature of a crosslinking agent, and the like. In dynamic heat treatment, the dispersion and crosslinking reaction of each component are simultaneously or continuously performed by melting and kneading. By this dynamic heat treatment, in the first aspect of the invention, an olefinic thermoplastic elastomer composition can be produced that is composed of any one of the following:

(1) a continuous phase which consists of an olefinic resin and a moderately cross-linked vinyl copolymer and a dispersed phase which consists of a moderately cross-linked copolymer rubber, (2) a continuous phase which consists of an olefinic resin and a dispersed phase which consists of a moderately cross-linked vinyl copolymer and a moderately cross-linked copolymer rubber, and (3) a continuous phase which consists of an olefinic resin and a moderately cross-linked vinyl copolymer and a dispersed phase which consists of a moderately cross-linked vinyl copolymer and a moderately cross-linked copolymer rubber.

Machines used for dynamic heat treatment are not limited to specific machines. Batch type kneading machines, such as a pressure kneader, Banbury mixer, or Brabender mixer, can be used. Continuous type kneading machines, such as a single screw extruder, twin screw extruder, or feeder ruder, can also be used. A machine in which the batch and continuous type kneading machines are integrally constructed can also be used. The batch and continuous type kneading machines can also be combined with each other.

As the aforementioned "crosslinking agent", an agent normally used to cross-link a diene-containing rubber, for example, can be used without being limited to a specific one. Sulfur, a sulfur compound, an organic peroxide, a phenolic resin crosslinking agent, a quinoid crosslinking agent, an acrylate metal salt crosslinking agent, a bismaleimide crosslinking agent, and the like, can be mentioned as the crosslinking agent.

As the organic peroxide, there can be mentioned dicumyl peroxide, di-tert-butyl peroxide, 2,5-dimethyl-2,5-di(tertbutyl peroxy) hexane, 1,3-bis (tert-butyl peroxy isopropyl) benzene, 1,1 -bis (tert-butyl peroxy)-3,3,5-trimethylcyclohexane, tert-butyl peroxide, 2,5-dimethyl-2, 5-di(tert-butyl peroxy) hexyne-3, benzoyl peroxide, and the like.

To perform uniform, moderate crosslinking, a crosslinking agent, such as organic peroxide, is used in an amount of preferably, 0.03–2.3 parts, provided that the total amount of a copolymer rubber, olefinic resin, and vinyl copolymer is 100 parts, as stated in claim 3 or 11. Alternatively, the total amount of an olefinic resin and vinyl copolymer is 100 parts, as stated in claim 19 or 27. It is more preferable to use 0.05–2.0 parts, and most preferable to use 0.1–1.5 parts of the crosslinking agent. Further, in order to improve the dispersibility of the crosslinking agent, a masterbatch can be prepared and used in which a high density crosslinking agent is beforehand contained in the copolymer rubber or the vinyl copolymer. If the quantitative ratio of the crosslinking agent is within the aforementioned range, mechanical characteristics can be sufficiently improved without impairing the molding processability.

If organic peroxides are used as crosslinking agents, they can be mixed with crosslinking assistant agents, such as (1) sulfur, (2) oximes such as p-quinone dioximes, (3) polyfunctional vinyl monomers such as triallyl cyanurate, divinylbenzene, and polyfunctional methacrylate monomers (for example, ethylene glycol dimethacrylate and acrylic methacrylate). As a result, the copolymer rubber and the vinyl copolymer can be cross-linked more promptly and sufficiently. The crosslinking assistant agents can be mixed and used in an amount of about 0.1–2.0 parts, most preferably 0.3–1.5 parts based on the total amount of the copolymer rubber, olefinic resin, and vinyl copolymer which is 100 parts.

If organic peroxides are used as crosslinking agents, then tetrakis-[methylene-3-(3',5'-di-tert-butyl-4'-hydroxyphenyl) propionate]methane, for example, can be used as a "specific antioxidant" for deactivating the crosslinking agent in the aforementioned "separate processing method" and "post-addition method".

The "crosslinking gel percentage" of the elastomer composition of the present invention can be obtained as a value calculated such that post-extraction weight of the elastomer composition, which is extracted by boiling toluene for two hours, is divided by pre-extraction weight and is multiplied by 100. In the elastomer composition that contains a flame retardant that has not been extracted by the above condition, the crosslinking gel percentage is calculated by subtracting the weight of the flame retardant from the post-extraction weight and dividing the resulting weight by the pre-extraction weight and then multiplying by 100. In the elastomer compositions of the first and third aspects, this crosslinking gel percentage is preferably 10% or more, more preferably 20% or more, even more preferably 50% or more, and most preferably 90% or more. The crosslinking gel percentage can be substantially 100% as long as the molding processability of the elastomer composition is not impaired. On the other hand, in the elastomer compositions of the second and fourth aspects, the crosslinking gel percentage is preferably 95% or less, more preferably 90% or less, even more preferably 70% or less, and most preferably 60% or less. The lower limit of the crosslinking gel percentage depends on mechanical characteristics required for the elastomer composition. It is, for example, 10% or more, preferably 20% or more, and 20 more preferably 30% or more.

The elastomer composition of the present invention can also contain flame retardants. A flame retardant, that is used in general in this kind of elastomer composition can be used as the aforementioned "flame retardant", without being limited to a specific one. For example, antimony trioxides, triphenyl phosphates that can also act as a plasticizer, and the like, can be mentioned in addition to phosphorous flame retardants and halogenic flame retardants such as chloric and bromic flame retardants. Both, organic and inorganic flame retardants can be used. Only one of these kinds of flame retardants can be used, or two or more kinds of flame retardants can be used together. Further, only halogen free flame retardants or only halogen containing flame retardants can be used as the flame retardant. The halogen free and halogen containing flame retardants can also be used together at a proper quantitative ratio.

The amount of the flame retardants can be below 100 parts, for example, provided that the total amount of the copolymer rubber, the olefin resin, and the vinyl copolymer is 100 parts in the first and second aspects of the invention, or provided that the total amount of the olefin resin and the vinyl copolymer is 100 parts in the third and fourth aspects of the invention. It is preferable to use 1–90 parts, more preferable 25–75 parts, even more preferable 30–70 parts, and most preferable 40–60 parts. The elastomer composition of the present invention can meet V-1 of the UL flame resistance test standard, and V-0 even if the amount of the flame retardants is below 75 parts, preferably below 50 parts.

In the elastomer composition of the present invention, sufficient flame resistance can be obtained without using halogen containing flame retardants or, if used, with a smaller amount of halogen containing flame retardants than before. This is very advantageous from the viewpoint of recent efforts to avoid pollution of the environment. Additionally, mechanical characteristics, elastic recoverability, molding processability, and the like, can be prevented from decreasing because of a large amount of flame retardants.

Further, a reinforcing agent, a filling agent such as white filling agent, an antioxidant, an antistatic agent, an ultraviolet ray absorption agent, an ultraviolet ray inhibitor, and a lubricant can be added to the resin-rubber composition in the first and second aspects, and to the resin composition in the third and fourth aspects. The addition of such materials is in accordance with the usage and characteristics necessary, and within the range where mechanical characteristics, molding processability, and the like, are not impaired. Thermoplastic resins other than olefinic resins or elastomers other than the copolymer rubber used in the present invention can be added.

In the elastomer composition of the present invention, the vinyl copolymer which has a high copolymerization ratio of the specific vinyl monomers mentioned above acts as a softening agent. Therefore, there is no need to use oils, such as paraffinic, naphthenic, or aromatic mineral oils, which are normally mixed with this kind of elastomer composition as a softening agent. Thus, since oils acting as the softening agent are not used, the surface of a molded article is prevented from being contaminated by bleedout, and the environment is prevented from being contaminated by its vaporization. Since the vinyl copolymer acts as the softening agent, the elastomer composition can have sufficient molding processability, without using oils as the softening agent.

The elastomer composition of the present invention can contain oils acting as a softening agent to the extent that environmental pollution is not caused. If necessary, the elastomer composition can be combined with, for example, a white filling agent. A proper quantity of softening agents can also be used to adjust the hardness of the elastomer composition. The content of the oils acting as the softening agent can be, for example, below 20 parts, preferably below 15 parts provided that the total amount of the copolymer rubber, the olefin resin, and the vinyl copolymer is 100 parts in the first and second aspects of the invention, or provided that the total amount of the olefin resin and the vinyl copolymer is 100 parts in the third and fourth aspects of the invention. It is more preferably below 10 parts, even more preferably below 8 parts, and most preferably below 5 parts.

Oils acting as the softening agent are prone to cause bleedout, and are easily extracted when an elastomer composition that contains the oils is brought into contact with a solvent. However, in the elastomer composition of the present invention which contains no oils or a small amount of oils, the extraction ratio thereof can be below 10%, especially below 5%, further below 3% under the condition that a mixed solution in which the weight ratio of toluene to ethyl alcohol is 30:70 (ETA) is used as a solvent, and one-hour extraction is carried out while the solvent is boiling. Since the extracted quantity is small as described above, it is conjectured that the elastomer composition of the present invention has less possibility of bleedout and vaporization, and is effective for preventing surface contamination of a molded article and preventing or restraining environmental pollution. Additionally, since it contains no or a small amount of oils acting as the softening agent, the decrease in flame resistance, which is caused by the oils, can be prevented or restrained.

The thus prepared elastomer composition of the present invention is superior in mechanical characteristics, elastic recoverability, and molding processability, even if it contains no or a small amount of softening agents. The elastomer composition is useful for various packing and sealing materials. The elastic recoverability can be evaluated by compression set. The compression set can be adjusted to be 30–80%, specifically 30–70%, and more specifically 30–60%. On the other hand, the molding processability can be evaluated by a melt flow rate (MFR). The MFR can be set to be 100 g/10 min or more, specifically 120 g/10 min or more, (normally, 300 g/10 min or less) under the condition of 180° C. and 100 kg, for example. The MFR can be set to be 1 g/10 min or more, specifically 5 g/10 min or more under the condition of 230° C. and 10 kg. The MFR can be adjusted by the kind and quantitative ratio of resins, rubbers, and other components, and is not limited to the aforementioned range.

The elastomer composition of the present invention can also be superior in balance of the aforementioned respective characteristics. For example, the tensile strength is 30 kg/cm$^2$ or more, preferably 50 kg/cm$^2$ or more, the JIS-A hardness is 60–95, preferably 60–80, the compression set (70° C., 22 hours, 25% compression) is 20–90%, preferably 30–80%, and the MFR is 1 g/10 min or more, preferably 5 g/10 min or more under the condition of 230° C., 10 kg. Further, the elastomer composition of the present invention can have these characteristics and, at the same time, meet V-1, more preferably V-0, of the UL flame resistance test standard.

EMBODIMENTS OF THE INVENTION

The present invention will be hereinafter described in more detail according to the embodiments.

Each component used in the embodiments is as follows.
(1) Copolymer Rubber Ethylene-propylene-diene copolymer rubber (made by JSR Co., Ltd. trade name "EP57C")
(2) Olefinic Resin
   1) resin-1; polypropylene (made by Mitsubishi Chemical Corporation, trade name "NOVATEC BC-1")

2) resin-2; polypropylene (made by Mitsubishi Chemical Corporation, trade name "NOVATEC BC 06C")

(3) Vinyl Copolymer 1) vinyl copolymer-1; ethylene-vinyl acetate copolymer, made by TOSOH CORP., trade name "ULTRACEN 760" (vinyl acetate copolymerization ratio; 42%)

2) vinyl copolymer-2; ethylene-vinyl acetate copolymer, made by TOSOH CORP., trade name "ULTRACEN 750" (vinyl acetate copolymerization ratio; 32%)

3) vinyl copolymer-3; ethylene-vinyl acetate copolymer, made by TOSOH CORP., trade name "ULTRACEN 710" (vinyl acetate copolymerization ratio; 28%)

4) vinyl copolymer-4; ethylene-vinyl acetate copolymer, made by TOSOH CORP., trade name "ULTRACEN 635" (vinyl acetate copolymerization ratio; 25%), narrow in molecular weight distribution and high in strength 5) vinyl copolymer-5; ethylene-vinyl acetate copolymer, made by Japan Unica Corporation, trade name "PES400" (vinyl acetate copolymerization ratio; 18%)

6) vinyl copolymer-6; ethylene-vinyl methyl ether copolymer (vinyl methyl ether copolymerization ratio; 25%)

(4) Crosslinking Agent 1) crosslinking agent-1; 1,3-bis(tert-butyl peroxyisopropyl)benzene (made by KAYAKU AKUZO CORPORATION, trade name "Perkadox 14"

2) crosslinking agent-2; dicumyl peroxide (made by Nippon Oils and Fats Co., Ltd., trade name "Perkmil D")

(5) Softening Agent made by Idemitsu Kosan Co., Ltd., trade name "Diana Process PW-380"

(6) Flame Retardant 1) flame retardant-1; phosphoric acid guanidine (made by Sanwa Chemical Co., Ltd., trade name "Apinon-301")

2) flame retardant-2; decabromodiphenyl oxide (made by Nippoh Chemicals Co., Ltd., trade name "FR-PE")

3) flame retardant-3; antimony trioxide (made by Nippon Seiko Co., Ltd., trade name "PATOX-H")

4) flame retardant-4; triphenyl phosphate (made by Daihachi Chemical Industry Co., Ltd., trade name "TPP").

Evaluations of obtained elastomer compositions were made according to the following methods.

(1) Integration of Compounds when Extruded from Mixers

The state of a compound when it was extruded from a mixer was visually observed. The criterion is as follows.

◎; It has integrally coalesced into a mass having a diameter (maximum length) of 10 cm or more and can be easily handled.

○; Some grainy pieces are dispersed in the integrated mass, but there is no problem in handling it.

Δ; There is a slight tendency to be dispersed as grainy pieces having a diameter of about 2–10 mm, but there is no serious problem in handling it.

(2) Hardness

JIS A hardness measured in accordance with JIS K 6253.

(3) Compression Set

Compression set measured at 70° C., for 22 hours, and at 25% compression. Measurement in accordance with JIS K 6262.

(4) Fluidity

MFR was measured to evaluate fluidity. The larger the MFR is, the higher is the fluidity, and the more superior is the molding processability. The measurement conditions of embodiments 1 and 2 are a temperature of 180° C. and a load of 100 kg. The measurement conditions of embodiment 3 are a temperature of 230° C. and a load of 10 kg.

(5) Flame Resistance

Measurement was conducted in accordance with the flame resistance test method of the UL standard. In more detail, the elastomer composition was brought into contact with flames for ten seconds, and was then removed 6 inches or more from the flames while measuring the time until the flame was extinguished (first extinguishing time). After extinguishing, it was again brought into contact with the flames for ten seconds, and was then removed while measuring the time until it was extinguished (second extinguishing time). It was measured five times by this method. The criterion of flame resistance is as follows.

UL flame resistance test standard V-0 agreement: The total time until it is extinguished is within 50 seconds in the measurement conducted five times.

UL flame resistance test standard V-1 agreement: The total time until it is extinguished is within 250 seconds in the measurement conducted five times.

(6) Extraction Ratio

A sample of 5 g that comprises an elastomer composition was put into a Soxhlet extractor. ETA (toluene/ethyl alcohol=30/70) was used as a solvent. Extraction continued for one hour while boiling, and was dried for 30 minutes at 105° C. After drying, the sample was weighed. The extraction ratio was calculated according to the following formula.

Extraction ratio (%)=[(weight of sample before extraction−weight of sample after extraction)/weight of sample before extraction]×100

(7) Bleeding Resistance

A sample comprising an elastomer composition was maintained for 168 hours at 40° C., and was cooled down to room temperature, and thereafter the state of the surface of the sample was observed. The criterion is as follows.

○; Bleeding is not discerned.

Δ; A little bleeding is discerned.

x; A remarkable bleeding is discerned.

(8) Crosslinking Gel Percentage and Non-crosslinking Component Percentage

A sample of 5 g that comprises an elastomer composition was put into a Soxhlet extractor. It was extracted for two hours with boiling toluene, and was quickly filtered to be divided into an extraction remainder A (crosslinking gel) and a filtrate B. The extraction remainder A was dried for 30 minutes at 105° C. The crosslinking gel percentage was calculated from the weight according to the following formula. It is noted that, concerning a composition that includes a flame retardant not extracted by this condition, the crosslinking gel percentage was calculated by using a value obtained by subtracting the weight of the flame retardant from the extraction remainder A (which includes crosslinking gel and flame retardant).

Crosslinking gel percentage (%)=[weight of toluene extraction remainder (A)/weight of sample before toluene extraction (S)]×100

A filtrate B obtained by the aforementioned operation was cooled to room temperature, and was filtered to be divided into a precipitate BA (mainly composed of an olefinic resin) and a filtrate BB. Thereafter, a large amount of methanol was mixed with the filtrate BB so as to precipitate dissolved matter. These were filtered and divided into a precipitate CA and a filtrate CB.

The precipitate CA was soaked in a toluene/methanol (=30/70 (weight ratio)) mixture, was then stirred for one hour, and was kept still standing for 24 hours. Thereafter, it was filtered to be divided into a precipitate DA (mainly composed of a copolymer rubber) and a filtrate DB. The filtrate DB was mixed with a large amount of methanol so as to precipitate dissolved matter, and was filtered to be divided into a precipitate EA (mainly composed of a vinyl copolymer) and a filtrate EB. The operating procedure is shown in FIG. 1.

The obtained precipitates BA, DA, and EA were dried for 30 minutes at 105° C., and were weighed. From the respective weights, the respective percentages (non-crosslinking component content percentage) of a non-crosslinking olefinic resin, a non-crosslinking copolymer rubber, and a non-crosslinking vinyl copolymer in the whole elastomer composition were calculated according to the following formula.

> Non-crosslinking component content percentage of olefinic resin (%)=[weight of room temperature precipitate after toluene extraction (BA)/weight of sample before toluene extraction (S)]×100;
>
> Non-crosslinking component content percentage of copolymer rubber(%)=[weight of insoluble part of toluene-methanol mixture liquid (DA)/weight of sample before toluene extraction (S)]×100
>
> Non-crosslinking component content percentage of vinyl copolymer (%)=[weight of methanol insoluble part (EA)/weight of sample before toluene extraction (S))]×100

(9) Vinyl Copolymer Non-crosslinking Ratio

From the "non-crosslinking component content percentage of vinyl copolymer", the percentage (non-crosslinking ratio) of the non-crosslinking vinyl copolymer in the whole of the vinyl copolymer contained in the sample before toluene extraction was calculated according to the following formula.

> Vinyl copolymer non-crosslinking ratio (%)=[non-crosslinking component content percentage of vinyl copolymer/content percentage of vinyl copolymer to sample before toluene extraction (S)]×100

Embodiment 1

The elastomer composition of examples 1–9 of Table 1 and the elastomer composition of examples 10–15 of Table 2 are prepared using the aforementioned copolymer rubber, the olefinic resin, the vinyl copolymer, the crosslinking agent, and the like. These compositions are prepared such that the olefinic resin is first put into a pressure type kneader adjusted to 160° C., and kneaded until it is sufficiently melted and dispersed. Thereafter the copolymer rubber, the vinyl copolymer, the crosslinking agent, and the like, are added and continuously kneaded for five minutes. The result of the obtained elastomer composition which was evaluated according to the aforementioned method is shown in Table 1 and Table 2. The amount of each component is represented in parts by weight in the tables.

Example 2 shows that the mixing amount of the copolymer rubber is larger than in example 1. Example 3 shows that the copolymer rubber has been further increased. Example 4 shows that the copolymer rubber is not used, and the vinyl copolymer has been voluminously mixed. Example 5 shows that the kind of the crosslinking agent has been changed. Example 6 shows that the ethylene-vinyl acetate copolymer in which a vinyl acetate content is lower than example 1 is used as a vinyl copolymer. Example 7 shows that the ethylene-vinyl acetate copolymer which is narrow in a molecular weight distribution and high in strength is used in addition. Examples 8 and 9 show that the amount of the crosslinking agent has been changed within the range as stated in claim 3.

According to the result of Table 1, in examples 1–3 and 5–9 corresponding to the first aspect of the invention, and in example 4 corresponding to the third aspect of the invention, it is understood that olefinic thermoplastic elastomer compositions have been obtained in spite of differences in integration and in physical properties. The thermoplastic elastomer compositions are provided with desired mechanical characteristics, hardness, elastic recoverability, and molding processability. These elastomer compositions are also superior in bleeding resistance because they do not contain oils (conventional softening agents).

TABLE 1

|  | Examples | | | | | | | | |
|---|---|---|---|---|---|---|---|---|---|
|  | 1 | 2 | 3 | 4 | 5 | 6 | 7 | 8 | 9 |
| Copolymer rubber | 55 | 65 | 70 | — | 55 | 55 | 55 | 55 | 55 |
| Olefinic resin - 1 | 20 | 20 | 20 | 20 | 20 | 20 | 20 | 20 | 20 |
| Vinyl copolymer | | | | | | | | | |
| 2 | 25 | 15 | 10 | 80 | 25 | | 10 | 25 | 25 |
| 3 | | | | | | 25 | | | |
| 4 | | | | | | | 15 | | |
| Crosslinking agent | | | | | | | | | |
| 1 | 0.2 | 0.2 | 0.4 | 0.2 | | 0.2 | 0.2 | 0.05 | 2 |
| 2 | | | | | 0.2 | | | | |
| Integration | ◎ | ◎ | ◎ | ◎~○ | ◎ | ◎ | ◎ | ◎ | ○ |
| Tensile strength (kgf/cm²) | 76 | 70 | 83 | 84 | 75 | 90 | 110 | 70 | 85 |
| Elongation (%) | 350 | 360 | 470 | 510 | 400 | 850 | 420 | 450 | 300 |
| Hardness (JIS-A) | 78 | 75 | 74 | 78 | 77 | 80 | 82 | 76 | 80 |
| Compression set (%) | 70 | 64 | 39 | 78 | 65 | 75 | 78 | 72 | 65 |
| MFR (g/10 min) (180° C., 100 kg) | 160 | 130 | 100 | 200 | 180 | 120 | 100 | 200 | 100 |
| Extraction ratio (%) | 0.2 | — | — | — | — | — | — | — | — |
| Bleeding resistance | ○ | ○ | ○ | Δ | ○ | ○ | ○ | ○ | ○ |

TABLE 2

|  | Examples | | | | | |
| --- | --- | --- | --- | --- | --- | --- |
|  | 10 | 11 | 12 | 13 | 14 | 15 |
| Copolymer rubber | 55 | 55 | 55 | 55 | 75 | 20 |
| Olefinic resin - 1 | 20 | 20 | 20 | 20 | 20 | 75 |
| Vinyl copolymer |  |  |  |  |  |  |
| 2 | — |  | 25 | 25 | 5 | 5 |
| 5 |  | 25 |  |  |  |  |
| Crosslinking agent - 1 | 0.2 | 0.2 | — | 2.5 | 0.2 | 0.2 |
| Softening agent | 25 | — | — | — | — | — |
| Integration | ◎ | ◎ | ◎ | Δ | ◎ | Δ |
| Tensile strength (kgf/cm²) | 53 | 97 | 37 | 110 | 50 | 140 |
| Elongation (%) | 420 | 390 | 800 | 100 | 400 | 20 |
| Hardness (JIS-A) | 72 | 92 | 73 | 82 | 70 | 99 |
| Compression set (%) | 95 | 97 | >100 | 60 | 60 | 96 |
| MFR (g/10 min) (180° C., 100 kg) | 531 | 160 | 300 | 30 | 50 | 300 |
| Extraction ratio (%) | 24.8 | — | — | — | — | — |
| Bleeding resistance | X | ○ | ○ | ○ | ○ | ○ |

On the other hand, according to the result of Table 2, in example 10 in which process oils are voluminously used as the conventional softening agent in place of the vinyl copolymer, the tensile strength is small, the compression set is large, the elastic recoverability is insufficient, and bleeding is prone to occur though the fluidity is sufficient. In example 11 a vinyl copolymer is used in which the copolymerization ratio of vinyl monomers is less than a lower limit value, the elastomer composition is hard, the compression set is large, and the elastic recoverability is insufficient. In example 12 in which no crosslinking agent is used, it is understood that the tensile strength decreases greatly, the compression set increases remarkably, and the elastic recoverability decreases greatly.

In example 13 in which a large amount of crosslinking agents exceeding the upper limit as stated in claim 3 is used, kneaded materials become grainy and, accordingly, are prone to become slightly difficult to handle, and both the elongation and the fluidity decrease. In example 14 in which copolymer rubbers voluminously exceeding the upper limit as stated in claim 2 are used, the tensile strength becomes small, and the fluidity also decreases. In example 15 in which a large amount of olefinic resins is used far exceeding the upper limit as stated in claim 2, it is understood that the elongation decreases, the compression set increases, and the elastic recoverability decreases.

Embodiment 2

An examination was made of elastomer compositions that contain flame retardants.

The elastomer compositions of examples 16–25 of Table 3 and the elastomer compositions of examples 26–35 of Table 4 are prepared using the aforementioned copolymer rubber, the olefinic resin, the vinyl copolymer, the flame retardant, the crosslinking agent, and the like. These compositions are prepared such that the copolymer rubber, the olefinic resin, the vinyl copolymer, and the flame retardant are put into a pressure type kneader adjusted at 160° C. They are kneaded until they are sufficiently melted and dispersed. Thereafter the crosslinking agent is added and continuously kneaded for five minutes. The result of the obtained elastomer composition evaluated according to the aforementioned method is shown in Table 3 and Table 4. The amount of each component is represented in parts by weight in the tables.

TABLE 3

|  | Examples | | | | | | | | | |
| --- | --- | --- | --- | --- | --- | --- | --- | --- | --- | --- |
|  | 16 | 17 | 18 | 19 | 20 | 21 | 22 | 23 | 24 | 25 |
| Copolymer rubber | 40 | 40 | 70 | 20 | 40 | 40 | 70 | 40 | 40 | 40 |
| Olefinic resin - 1 | 10 | 10 | 10 | 10 | 30 | 10 | 10 | 10 | 10 | 10 |
| Vinyl copolymer |  |  |  |  |  |  |  |  |  |  |
| 1 | 50 | 50 | 20 | 10 | 30 | 50 | 20 |  | 50 | 50 |
| 2 |  |  |  |  |  |  |  | 50 |  |  |
| Flame retardant |  |  |  |  |  |  |  |  |  |  |
| 1 | 50 |  |  |  |  |  |  | 50 | 25 |  |
| 2 |  | 25 | 25 | 25 | 25 | 12.5 | 25 |  | 25 | 45 |
| 3 |  | 25 | 25 | 25 | 25 | 12.5 | 25 |  |  |  |
| 4 |  |  |  |  |  |  |  |  |  | 5 |
| Crosslinking agent - 1 | 0.4 | 0.4 | 0.4 | 0.4 | 0.4 | 0.4 | 0.8 | 0.4 | 0.4 | 0.4 |
| Integration | ○ | ◎ | ◎~○ | ◎~○ | ◎~○ | ◎ | ○ | ○ | ◎~○ | ◎~○ |
| Tensile strength (kgf/cm²) | 36 | 48 | 50 | 45 | 81 | 55 | 59 | 38 | 37 | 32 |
| Elongation (%) | 300 | 540 | 500 | 250 | 610 | 440 | 270 | 250 | 320 | 280 |
| Hardness (JIS-A) | 77 | 69 | 66 | 80 | 91 | 69 | 66 | 81 | 71 | 74 |
| Compression set (%) | 63 | 48 | 45 | 68 | 59 | 60 | 24 | 61 | 51 | 58 |
| MFR (g/10 min) (180° C., 100 kg) | 215 | 634 | 200 | 500 | 1200 | 700 | 100 | 139 | 251 | 239 |
| Extraction ratio (%) | 0.3 | — | — | — | — | — | — | — | — | 3.2 |
| Bleeding resistance | ○ | ○ | ○ | ○ | ○ | ○ | ○ | ○ | ○ | ○ |
| Flame resistance |  |  |  |  |  |  |  |  |  |  |
| Flame-out time (sec) (N = 5) | 0 | 0 | 3 | 0 | 1 | 31 | 2 | 0 | 0 | 0 |
|  | 0 | 0 | 4 | 0 | 1 | 19 | 3 | 0 | 0 | 1 |
|  | 2 | 0 | 5 | 1 | 1 | 28 | 5 | 0 | 1 | 1 |
|  | 9 | 0 | 5 | 0 | 2 | 25 | 4 | 1 | 1 | 1 |
|  | 9 | 1 | 7 | 0 | 1 | 22 | 5 | 8 | 1 | 1 |

TABLE 4

|  | Examples | | | | | | | | | |
|---|---|---|---|---|---|---|---|---|---|---|
|  | 26 | 27 | 28 | 29 | 30 | 31 | 32 | 33 | 34 | 35 |
| Copolymer rubber | 80 | 45 | 20 | 10 | 40 | 40 | 40 | 90 | 40 | 40 |
| Olefinic resin - 1 | 10 | 5 | 50 | 10 | 10 | 10 | 10 | 10 | 10 | 10 |
| Vinyl copolymer | | | | | | | | | | |
| 1 | 10 | 50 | 30 | 80 | 50 | 50 | — | — | 50 | 50 |
| 5 | — | — | — | — | — | — | 50 | — | — | — |
| Flame retardant - 1 | 50 | 50 | 50 | 50 | 80 | 50 | 50 | 200 | 50 | 50 |
| Crosslinking agent - 1 | 0.4 | 0.4 | 0.4 | 0.4 | 0.4 | 2.5 | 0.4 | 0.4 | 0.4 | 0.4 |
| Softening agent | — | — | — | — | — | — | — | — | 5 | 30 |
| Integration | Δ~○ | Δ | ⊚ | ○ | Δ | Δ | ○ | ○ | ⊚ | ⊚ |
| Tensile strength (kgf/cm²) | 56 | 40 | 67 | 39 | 25 | 48 | 37 | 10 | 30 | 24 |
| Elongation (%) | 250 | 350 | 100 | 150 | 180 | 150 | 250 | 170 | 350 | 480 |
| Hardness (JIS-A) | 72 | 16 | 97 | 84 | 90 | 79 | 83 | 78 | 75 | 64 |
| Compression set (%) | 41 | 55 | 96 | 83 | 92 | 28 | 85 | 97 | 65 | 15 |
| MFR (g/10 min) (180° C., 100 kg) | 40 | 80 | 1500 | 270 | 50 | 40 | 250 | 82 | 300 | 725 |
| Extraction ratio (%) | — | — | — | — | — | — | — | — | 3.2 | 16.4 |
| Bleeding resistance | ○ | ○ | ○ | ○ | ○ | ○ | ○ | Δ | X | — |
| Flame resistance | 20 | 0 | 5 | 0 | 0 | 0 | 15 | 0 | 9 | >60 |
| Flame-out time (sec) (N = 5) | 25 | 1 | 6 | 0 | 0 | 0 | 18 | 0 | 8 | >60 |
|  | 25 | 2 | 8 | 3 | 0 | 1 | 19 | 0 | 8 | >60 |
|  | 28 | 2 | 9 | 4 | 0 | 2 | 20 | 0 | 7 | >60 |
|  | 30 | 5 | 12 | 4 | 1 | 2 | 20 | 0 | 9 | >60 |

Example 16 has used a phosphorous flame retardant. Example 17 has used an antimonial flame retardant together with a halogen containing flame retardant. Examples 18–20 show that the amount of rubbers or resins is changed within the range as stated in claim 2. Example 21 shows that the content of flame retardants including the halogen-containing flame retardant has been reduced by half. Example 22 shows that the crosslinking agent has been increased within the range as stated in claim 3. Example 23 shows that the ethylene-vinyl acetate copolymer having a small vinyl acetate content has been used. Example 24 shows that the phosphorous and halogen-containing flame retardants have been used together. Example 25 shows that the phosphorous flame retardant has been used together with triphenyl phosphate that can act as a plasticizer.

According to the result of Table 3, it is understood that an olefinic thermoplastic elastomer composition has been obtained having the desired flame resistance, mechanical characteristics, and molding processability in spite of differences in integration, in various physical properties, and in flame resistance, depending on the quantitative ratio of the copolymer rubber and the olefinic resin and depending on the kind of the flame retardant. These compositions were also superior in bleeding resistance.

On the other hand, according to the result of Table 4, in example 26 in which the quantitative ratio of the copolymer rubber is high, fluidity is insufficient, and flame resistance also has a tendency to decrease though flexibility is sufficient. In example 27 in which the quantitative ratio of the olefinic resin is low, fluidity is insufficient though flexibility is good, and kneaded materials become grainy and, accordingly, slightly difficult to handle. On the other hand, in example 28 in which the quantitative ratio of the olefinic resin is high, hardness and compression set are large, and elastic recoverability is insufficient though fluidity is improved greatly. Also in example 29 in which the quantitative ratio of the vinyl copolymer is high, compression set is large, and elastic recoverability is insufficient.

In example 30 in which the flame retardant content is high, kneaded materials become grainy and, accordingly, slightly difficult to handle. The tensile strength also becomes small, fluidity decreases, and molding processability decreases. Also in example 31 in which the crosslinking agent content is high, kneaded materials become grainy and, accordingly, slightly difficult to handle, fluidity also decreases greatly, and molding processability decreases. In example 32 in which an ethylenevinyl acetate copolymer having a vinyl acetate content of less than a lower limit value of the first aspect of the invention has been used, compression set is large, elastic recoverability is insufficient, and flame resistance also shows a tendency to decrease. In example 33 in which the quantitative ratio of a copolymer rubber is high and a flame retardant is voluminously contained, tensile strength and fluidity decrease greatly, and elastic recoverability and molding processability are insufficient though flame resistance is good. In example 34 that has oils acting as softening agents in an amount of 5 parts, mechanical characteristics and flame resistance show a tendency to decrease, but they are within a range of practical use, and molding processability has improved. On the other hand, in example 35 that has softening agents present in an amount of 30 parts, molding processability is sufficient, but mechanical characteristics and elastic recoverability have decreased, bleeding is prone to occur, and flame resistance is insufficient.

Embodiment 3

An examination was made of elastomer compositions that contain vinyl copolymers that have not undergone thermal crosslinking processing.

The elastomer compositions of examples 36–45 of Table 5, the elastomer compositions of examples 46–55 of Table 6, and the elastomer compositions of examples 56–60 of Table 7 are prepared using the aforementioned copolymer rubber, the olefinic resin, the vinyl copolymer, the flame retardant, the crosslinking agent, and the like.

In examples 36 and 41, the compositions are prepared such that all of the copolymer rubber, the olefinic resin, and the vinyl copolymer, and the flame retardant are put into a pressure type kneader adjusted at 160° C., and they are sufficiently kneaded until they are melted and dispersed. Thereafter the crosslinking agent is added and continuously kneaded for five minutes. (Hereinafter, this is referred to a "complete crosslinking method". The preparation method of the elastomer compositions in the embodiments 1 and 2 corresponds to the complete crosslinking method.)

In the examples other than examples 36 and 41, the compositions are prepared according to the following method (called "post-addition method"). The copolymer rubber, the olefinic resin, and some of the vinyl copolymer which are required to undergo thermal crosslinking processing, and the flame retardant are put into a pressure type kneader adjusted at 160° C., and are kneaded until they are sufficiently melted and dispersed. Thereafter, the crosslinking agent is added. They are then kneaded for five minutes, an antioxidant is then added and sufficiently dispersed so as to stop the crosslinking in the kneader. Thereafter, the remainder of the vinyl copolymer that does not undergo thermal crosslinking processing is added (post-addition). They are then kneaded until they are sufficiently melted and dispersed; and they are extruded. As the antioxidant, tetrakis-[methylene-3-(3',5'-di-tert-butyl-4'-hydroxyphenyl)propionate]methane is used in the ratio of 0.1 parts to 100 parts which indicates the total amount of the copolymer rubber, olefinic resin, and vinyl copolymer (total amount).

The result of the obtained elastomer composition evaluated according to the aforementioned method is shown in Tables 5 to 7. The amount of each component is represented in weight-parts (parts by weight) in the tables.

TABLE 5

| | Examples | | | | | | | | | |
|---|---|---|---|---|---|---|---|---|---|---|
| | 36 | 37 | 38 | 39 | 40 | 41 | 42 | 43 | 44 | 45 |
| Copolymer rubber | 50 | 50 | 50 | 50 | 50 | 50 | 50 | 50 | 50 | 50 |
| Olefinic resin - 2 | 10 | 10 | 10 | 10 | 10 | 20 | 20 | 20 | 20 | 20 |
| Vinyl copolymer - 1 | | | | | | | | | | |
| Heat crosslinking processing | 40 | 30 | 20 | 10 | 0 | 30 | 22.5 | 15 | 7.5 | 0 |
| Post-addition | 0 | 10 | 20 | 30 | 40 | 0 | 7.5 | 15 | 22.5 | 30 |
| Non-crosslinking ratio (%) | 0 | 25 | 50 | 75 | 100 | 0 | 25 | 50 | 75 | 100 |
| Flame retardant | | | | | | | | | | |
| 2 | 25 | 25 | 25 | 25 | 25 | 25 | 25 | 25 | 25 | 25 |
| 3 | 25 | 25 | 25 | 25 | 25 | 25 | 25 | 25 | 25 | 25 |
| Crosslinking agent - 1 | 0.4 | 0.4 | 0.4 | 0.4 | 0.4 | 0.6 | 0.6 | 0.6 | 0.6 | 0.6 |
| Integration | ⊚ | ⊚ | ⊚ | ⊚ | ⊚ | ⊚ | ⊚ | ⊚ | ⊚ | ○ |
| Tensile strength (kgf/cm$^2$) | 47 | 43 | 40 | 35 | 30 | 70 | 70 | 69 | 65 | 62 |
| Elongation (%) | 580 | 550 | 500 | 480 | 470 | 400 | 390 | 370 | 340 | 300 |
| Hardness (JIS-A) | 69 | 67 | 66 | 64 | 62 | 84 | 85 | 84 | 84 | 84 |
| Compression set (%) | 59 | 57 | 58 | 59 | 59 | 43 | 44 | 46 | 47 | 48 |
| MFR (g/10 min) (230° 0., 100 kg) | 0.3 | 1.3 | 4.0 | 8.5 | 14 | 0.5 | 1.9 | 5.4 | 12 | 21 |
| Extraction ratio (%) | 0.2 | | | | | | | | | |
| Bleeding resistance | ○ | ○ | ○ | ○ | ○ | ○ | ○ | ○ | ○ | ○ |
| Crosslinking gel percentage (%) | 59.8 | 53.2 | 46.5 | 39.4 | 33.2 | 53.1 | 48.1 | 43.2 | 38.2 | 33.2 |
| Non-crosslinking component content percentage (%) | | | | | | | | | | |
| Copolymer rubber | 0 | 0 | 0 | 0 | 0 | 0 | 0 | 0 | 0 | 0 |
| Olefinic resin | 6.2 | 6.2 | 6.2 | 6.2 | 6.2 | 12.3 | 12.3 | 12.3 | 12.3 | 12.3 |
| Vinyl copolymer | 0 | 6.6 | 13.3 | 19.9 | 26.6 | 0 | 5.0 | 10.0 | 14.9 | 19.9 |
| Flame resistance | 0 | 1 | 2 | 2 | 1 | 6 | 5 | 3 | 4 | 2 |
| Flame-out time (sec) (N = 5) | 0 | 2 | 4 | 3 | 1 | 5 | 3 | 6 | 6 | 3 |
| | 1 | 2 | 5 | 4 | 1 | 2 | 2 | 1 | 7 | 6 |
| | 1 | 1 | 1 | 2 | 2 | 3 | 4 | 5 | 2 | 4 |
| | 0 | 3 | 3 | 1 | 1 | 2 | 6 | 3 | 3 | 2 |

TABLE 6

| | Examples | | | | | | | | |
|---|---|---|---|---|---|---|---|---|---|
| | 46 | 47 | 48 | 49 | 50 | 51 | 52 | 53 | 54 |
| Copolymer rubber | 50 | 50 | 50 | 50 | 50 | 50 | 50 | 90 | 90 |
| Olefinic resin - 2 | 10 | 10 | 10 | 10 | 10 | 10 | 10 | 10 | 10 |
| Vinyl copolymer - 1 | | | | | | | | | |
| Heat crosslinking processing | 30 | 30 | 20 | 10 | 20 | 20 | 40 | — | — |
| Post-addition | 10 | 10 | 20 | 30 | 20 | 20 | 0 | — | — |
| Non-crosslinking ratio (%) | 25 | 25 | 50 | 75 | 50 | 50 | 100 | — | — |
| Flame retardant | | | | | | | | | |
| 2 | 12.5 | — | — | — | 25 | 25 | 25 | 25 | 200 |
| 3 | 12.5 | — | — | — | 25 | 25 | 25 | 25 | — |
| Crosslinking agent - 1 | 0.4 | 0.4 | 0.4 | 0.4 | 0.4 | 0.4 | 0.4 | 0.4 | |
| Softening agent | — | — | — | — | 4 | 8 | — | 4 | 30 |

TABLE 6-continued

|  | Examples | | | | | | | | |
| --- | --- | --- | --- | --- | --- | --- | --- | --- | --- |
|  | 46 | 47 | 48 | 49 | 50 | 51 | 52 | 53 | 54 |
| Integration | ◎ | ◎ | ◎ | ◎ | ◎ | ◎ | Δ | ○ | Δ |
| Tensile strength (kgf/cm$^2$) | 40 | 55 | 52 | 48 | 37 | 34 | 21 | 47 | 25 |
| Elongation (%) | 580 | 450 | 460 | 500 | 490 | 510 | 720 | 480 | 80 |
| Hardness (JIS-A) | 65 | 69 | 68 | 66 | 63 | 61 | 60 | 73 | 85 |
| Compression set (%) | 51 | 37 | 39 | 42 | 59 | 72 | 93 | 38 | 91 |
| MFR (g/10 min) (230° C., 100 kg) | 2.5 | 8.5 | 3.4 | 1.1 | 9.8 | 11.2 | 47 | 0.01 | 0.02 |
| Extraction ratio (%) | 0.2 | — | — | — | 3.4 | 7.0 | — | — | 9.1 |
| Bleeding resistance | ○ | ○ | ○ | ○ | ○ | ○ | ○ | ○ | Δ |
| Crosslinking gel percentage (%) | 63.8 | 79.8 | 69.7 | 59.1 | 45.1 | 43.9 | 0 | 58.3 | 27.2 |
| Non-crosslinking component content percentage (%) | | | | | | | | | |
| Copolymer rubber | 0 | 0 | 0 | 0 | 0 | 0 | 28.8 | 0 | 0 |
| Olefinic resin | 7.3 | 9.8 | 9.8 | 9.8 | 6.2 | 6.1 | 6.2 | 6.2 | 3.1 |
| Vinyl copolymer | 6.9 | 9.8 | 19.7 | 19.6 | 12.5 | 12.4 | 25.9 | — | — |
| Flame resistance Flame-out time (sec) (N = 5) | 26 | >60 | >60 | >60 | 7 | 10 | 2 | 17 | 0 |
|  | 23 | >60 | >60 | >60 | 5 | 9 | 1 | 12 | 0 |
|  | 20 | >60 | >60 | >60 | 6 | 7 | 1 | 19 | 1 |
|  | 32 | >60 | >60 | >60 | 8 | 6 | 2 | 21 | 1 |
|  | 18 | >60 | >60 | >60 | 3 | 9 | 0 | 11 | 0 |

TABLE 7

|  | Examples | | | |
| --- | --- | --- | --- | --- |
|  | 55 | 56 | 57 | 58 |
| Copolymer rubber | — | — | — | 50 |
| Olefinic resin - 2 | 60 | 20 | 20 | 10 |
| Vinyl copolymer - 1 | | | | |
| Heat crosslinking processing | 20 | 80 | 40 | — |
| Post-addition | 20 | 0 | 40 | — |
| Non-crosslinking ratio (%) | 50 | 0 | 50 | — |
| Vinyl copolymer - 6 | | | | |
| Heat crosslinking processing | — | — | — | 0 |
| Post-addition | — | — | — | 40 |
| Non-crosslinking ratio (%) | — | — | — | 100 |
| Flame retardant | | | | |
| 2 | — | 25 | 25 | 25 |
| 3 | — | 25 | 25 | 25 |
| Crosslinking agent - 1 | 0.4 | 0.2 | 0.2 | 0.4 |
| Integration | Δ | ○ | Δ | ◎ |
| Tensile strength (kgf/cm$^2$) | 130 | 80 | 72 | 25 |
| Elongation (%) | 120 | 420 | 530 | 430 |
| Hardness (JIS-A) | 97 | 81 | 79 | 64 |
| Compression set (%) | 96 | 78 | 85 | 68 |
| MFR (g/10 min) (230° C., 100 kg) | >100 | 21.6 | 81 | 15.8 |
| Extraction ratio (%) | — | — | — | 0 |
| Bleeding resistance | ○ | ○ | ○ | ○ |
| Crosslinking gel percentage (%) | 18.9 | — | — | 33.2 |
| Non-crosslinking component content percentage (%) | | | | |
| Copolymer rubber | — | — | — | — |
| Olefinic resin | 58.9 | 12.8 | 12.8 | 6.2 |
| Vinyl copolymer | 18.9 | 0 | 25.9 | 26.6 |
| Flame resistance Flame-out time (sec) (N = 5) | >60 | 2 | 5 | 41 |
|  | >60 | 6 | 8 | 39 |
|  | >60 | 4 | 10 | 51 |
|  | >60 | 3 | 3 | 53 |
|  | >60 | 1 | 6 | 47 |

Examples 36–45 of the examples shown in Table 5 show an examination of the influence of the non-crosslinking ratio of the vinyl copolymer on physical properties, setting a target hardness at about 70 (examples 36–40) or 80 (examples 41–45). The MFR value could be arbitrarily adjusted within the range of 0.3–14 or 0.5–21 in each hardness, while maintaining an excellent compression set characteristic, by controlling the non-crosslinking ratio of the vinyl copolymer. In all these examples, superiority was shown both in flame resistance and in bleeding resistance.

Examples 46–49 shown in Table 6 show an elastomer composition prepared such that the flame retardant is reduced or removed from the composition of examples 37–39. Examples 50 and 51 show that oils acting as a softening agent are contained in the range as stated in claim 7 or 15. Since the elastomer composition of the present invention contains a predetermined vinyl copolymer, sufficient properties can be obtained in such small amounts of oils used as the softening agent, that the flame resistance is not impaired. In all these examples, superiority was shown both in flame resistance and in bleeding resistance.

On the other hand, in example 52 in which no crosslinking agent is used, the tensile strength decreases greatly, the compression set increases remarkably, and the elastic recoverability decreases greatly. Examples 53 and 54 are comparative examples that do not contain the vinyl copolymer. In example 53 in which the vinyl copolymer is merely removed from the composition of example 50, flame resistance is insufficient. In example 54 in which a large amount of flame retardants is added to the composition of example 53 exceeding the range as stated in claim 5 or 13 in order to improve flame resistance, and a large amount of softening agents is added exceeding the range as stated in claim 7 or 15 in order to prevent the decrease of fluidity which has been caused by the increase of the flame retardant, the tensile strength is small, and the elastic recoverability and the bleeding resistance are also insufficient though the fluidity is sufficient.

Examples 55–57 of Table 7 each show a composition that does not use a copolymer rubber. Example 58 uses a vinyl copolymer with which vinylether is copolymerized which is contained in the elastomer composition. These are elastomer compositions provided with practically sufficient mechanical characteristics and hardness, and which are excellent in elastic recoverability and in molding processability, and superior in bleeding resistance.

The present invention is not limited to the aforementioned embodiments. Various modified embodiments can be performed within the range of the present invention according to purposes and uses. For example, rubbers other than olefinic/diene rubbers or resins other than olefinic resins can also be used together in a quantitative ratio within a range as long as necessary characteristics of an obtained elastomer composition are not impaired. Crosslinking can also be performed by irradiating electron rays such as radioactive rays while mixing a crosslinking agent or while applying heat treatment without any crosslinking agent. During the crosslinking with electron rays, the rays can be irradiated while heating to a proper temperature. However, heating is not necessarily required.

What is claimed is:

1. An olefinic thermoplastic elastomer composition comprising:

a heat crosslinked resin-rubber composition produced in the presence of a crosslinking agent by applying heat treatment to a resin-rubber composition that contains an olefinic rubber and/or diene rubber, an olefinic resin, and a vinyl copolymer in which a vinyl monomer represented by chemical formulae (1) or (2) is copolymerized in an amount of 20 percent by weight or more, and in which at least a part of said vinyl copolymer has not undergone heat treatment in the presence of a crosslinking agent

$$CH_2=CHOCOR^1 \qquad (1)$$

$$CH_2=CHOR^2 \qquad (2)$$

wherein $R^1$ and $R^2$ are each an alkyl group having 1–6 carbon atoms.

2. The olefinic thermoplastic elastomer composition according to claim 1, wherein said olefinic rubber and/or diene rubber is 20–60 parts by weight based on a total amount of said olefinic rubber and/or diene rubber, said olefinic resin and said vinyl copolymer of 100 parts by weight.

3. The olefinic thermoplastic elastomer composition according to claim 2, wherein said crosslinking agent is present in an amount of 0.03–2.3 parts by weight based on a total amount of said olefinic rubber and/or diene rubber, said olefinic resin, and said vinyl copolymer of 100 parts by weight.

4. The olefinic thermoplastic elastomer composition according to claim 3, having a tensile strength of 30 kg/cm² or more, a JIS-A hardness of 60–95, a compression set at 70° C., 22 hours, 25% compression of 20–90%, and a melt-flow rate of 1 g/10 min or more under the condition of 230° C. and 10 kg.

5. The olefinic thermoplastic elastomer composition according to claim 3, further containing a flame retardant in an amount of 25–75 parts by weight based on a total amount of said olefinic rubber and/or diene rubber, said olefinic resin, and said vinyl copolymer of 100 parts by weight.

6. The olefinic thermoplastic elastomer composition according to claim 5, having a tensile strength of 30 kg/cm² or more, a JIS-A hardness of 60–95, a compression set at 70° C., 22 hours, 25% compression of 20–90%, and a melt-flow rate of 1 g/10 min or more under the condition of 230° C. and 10 kg.

7. The olefinic thermoplastic elastomer composition according to claim 3, further containing 10 parts by weight or less of an oil acting as a softening agent based on a total amount of said olefinic rubber and/or diene rubber, said olefinic resin, and said vinyl copolymer of 100 parts by weight.

8. The olefinic thermoplastic elastomer composition according to claim 7, having a tensile strength of 30 kg/cm² or more, a JIS-A hardness of 60–95, a compression set at 70° C., 22 hours, 25% compression of is 20–90%, and a melt-flow rate of 1 g/10 min or more under the condition of 230° C. and 10 kg.

9. The olefinic thermoplastic elastomer composition according to claim 3, wherein a content of said vinyl copolymer which has not undergone heat treatment in the presence of a crosslinking agent is 25–75 weight % with respect to 100 weight % as a total of said vinyl copolymer.

10. The olefinic thermoplastic elastomer composition according to claim 9, further containing a flame retardant of 25–75 parts by weight based on 100 parts by weight as a total of said olefinic rubber and/or diene rubber, said olefinic resin, and said vinyl copolymer.

11. The olefinic thermoplastic elastomer composition according to claim 9, further containing oils acting as a softening agent whose content is 10 parts or less by weight based on a total of said olefinic rubber and/or diene rubber, said olefinic resin, and said vinyl copolymer of 100 parts by weight.

12. An olefinic thermoplastic elastomer composition comprising:

a heat cross-linked resin-rubber composition produced in the presence of a crosslinking agent by applying heat treatment to a resin-rubber composition that contains an olefinic rubber and/or diene rubber, and an olefinic resin, and a vinyl copolymer in which a vinyl monomer represented by the following chemical formulae (1) or (2) is copolymerized in an amount of 25 or more percent by weight, and in which at least a part has not undergone heat treatment under the presence of a crosslinking agent, and said olefinic rubber and/or diene rubber is 20–65 parts by weight, said olefinic resin is 10–30 parts by weight, and said vinyl copolymer is 25–70 parts by weight based on a total of said olefinic rubber and/or diene rubber, said olefinic resin, and said vinyl copolymer of 100 parts by weight, and further containing oils acting as a softening agent whose content is 0–10 parts by weight based on a total of said olefinic rubber and/or diene rubber, said olefinic resin, and said vinyl copolymer of 100 parts by weight

$$CH_2=CHOCOR^1 \qquad (1)$$

$$CH_2=CHOR^2 \qquad (2)$$

(wherein $R^1$ and $R^2$ are each an alkyl group whose number of carbon atoms is 1–6).

13. The olefinic thermoplastic elastomer composition according to claim 12, wherein said crosslinking agent is 0.03–2.3 parts by weight based on a total of said olefinic rubber and/or diene rubber, said olefinic resin, and said vinyl copolymer of 100 parts by weight.

14. The olefinic thermoplastic elastomer composition according to claim 13, further containing a flame retardant of 25–75 parts by weight based on 100 parts by weight as a total of said olefinic rubber and/or diene rubber, said olefinic resin, and said vinyl copolymer.

15. The olefinic thermoplastic elastomer composition according to claim 13, wherein a content of said vinyl copolymer which has not undergone heat treatment in the presence of a crosslinking agent is 25–75 weight % with respect to 100 weight % as a total of said vinyl copolymer.

16. The olefinic thermoplastic elastomer composition according to claim 15, further containing a flame retardant of 25–75 parts by weight based on 100 parts by weight as a total of said olefinic rubber and/or diene rubber, said olefinic resin, and said vinyl copolymer.

17. The olefinic thermoplastic elastomer composition according to claim 1, wherein said vinyl is copolymerized in an amount of 25% by weight or more.

18. The olefinic thermoplastic elastomer composition according to claim 1, wherein said vinyl copolymer is copolymerized in an amount of 30 percent by weight or more.

19. The olefinic thermoplastic elastomer composition according to claim 1, wherein said composition has a cross-linking gel percentage of 95% or less.

20. The olefinic thermoplastic elastomer composition according to claim 1, wherein said composition has a cross-linking gel percentage of 60% or less.

21. The olefinic thermoplastic elastomer composition according to claim 1, wherein the degree of cross-linking of said vinyl copolymer is 10% or more.

22. The olefinic thermoplastic elastomer composition according to claim 1, wherein the degree of cross-linking of said vinyl copolymer is 60% or more.

* * * * *